United States Patent
Fan

(10) Patent No.: US 6,639,382 B1
(45) Date of Patent: Oct. 28, 2003

(54) MOBILE PHONE CHARGER WITH AUTOMATIC LIGHT

(76) Inventor: Eagle Fan, No. 133, Fu-Kuo St., Lu-Chang Li, Chupei City, Hsinchu Hsien (TW)

(*) Notice: Subject to any disclaimer, the term of this patent is extended or adjusted under 35 U.S.C. 154(b) by 0 days.

(21) Appl. No.: 10/207,544

(22) Filed: Jul. 27, 2002

(51) Int. Cl.$^7$ .............................................. H01M 10/46
(52) U.S. Cl. ...................................... 320/114; 320/115
(58) Field of Search .............................. 320/107, 112, 320/113, 114, 115; 362/172, 173, 183, 194, 195, 802

(56) References Cited

U.S. PATENT DOCUMENTS 5,686,808 A * 11/1997 Lutz
5,939,860 A * 8/1999 William

* cited by examiner

Primary Examiner—Edward H. Tso

(57) ABSTRACT

A mobile phone charger includes a casing defining an open chamber inside which a circuit board carrying a control circuit is fixed. Conductive blades in electrical connection with the circuit board extend beyond the casing for plugging in a wall outlet. The casing defines a socket for receivingly and releasably mating a plug formed on an inner end of a cable to form electrical connection between the cable and the circuit board. The cable has a remote end forming a connector for connection with a mobile phone to be charged. A plurality of light emitting diodes and a photo-sensitive resistor are mounted on the circuit board whereby when the photo-sensitive resistor detects the surroundings are darkening beyond a threshold, the light emitting diodes are energized by the circuit board to give off light for automatic lighting. A light-transmitting cover is mounted to the casing for covering the open chamber. A lens is formed on the cover for focusing the surrounding light onto the photo-sensitive resistor. An indicator capable of giving off light of two different colors is mounted to the circuit board whereby when the charger is charging a mobile phone, the indicator gives off the first light and when the charging is done, the indicator gives off the second light.

11 Claims, 3 Drawing Sheets

MOBILE PHONE CHARGER WITH AUTOMATIC LIGHT

FIELD OF THE INVENTION

The present invention relates generally to a mobile phone charger, and in particular to a mobile phone charger incorporating an automatic light that automatically turns on when the surroundings darken.

BACKGROUND OF THE INVENTION

A mobile phone is equipped with an internal power source comprised of a rechargeable battery set. The rechargeable battery set is charged by an external mobile phone charger that is plugged in an electric main, such as a wall outlet. FIG. 3 of the attached drawings shows a conventional mobile phone charger comprising a charging circuit housed in a casing 21 and a connection cable 22 in connection with the circuit and extending from the casing 21 for releasable connection with a charging connector of a mobile phone (not shown). A pair of blades 23 is mounted to the casing 21 and in electrical connection with the circuit for plugging in a wall outlet (not shown). The electricity stored in the rechargeable battery set is limited and the mobile phone must be periodically charged. A lot of persons are thus leaving the charger in connection with the wall outlet almost forever in order to avoid the troubles of frequently plugging in and removing the charger from the wall outlet. The charger that stays in connection with the wall outlet does nothing when it does not charge a mobile phone.

The mobile phone has become a consumer product. This means the general consumers frequently purchase new mobile phones to replace the original mobile phones. Since the rechargeable batteries of some mobile phones are electrically compatible while the charging connectors of the mobile phones are of different specifications, the general consumers have to change the mobile phone charger when they change mobile phones. A waste is thus caused.

It is thus desirable to make better use of the mobile phone charger that is kept in connection with the wall outlet.

SUMMARY OF THE INVENTION

An object of the present invention is to provide a mobile phone charger incorporating an automatic light which automatically turns on when the surroundings darken.

Another object of the present invention is to provide a mobile phone charger that have exchangeable connection cables for connection with different mobile phones whereby a single charges can serve a number of different mobile phones.

To achieve the above objects, in accordance with the present invention, there is provided a mobile phone charger comprising a casing defining an open chamber inside which a circuit board carrying a control circuit is fixed. Conductive blades in electrical connection with the circuit board extend beyond the casing for plugging in a wall outlet. The casing defines a socket for receivingly and releasably mating a plug formed on an inner end of a cable to form electrical connection between the cable and the circuit board. The cable has a remote end forming a connector for connection with a mobile phone to be charged. A plurality of light emitting diodes and a photo-sensitive resistor are mounted on the circuit board whereby when the photo-sensitive resistor detects the surroundings are darkening beyond a threshold, the light emitting diodes are energized by the circuit board to give off light for automatic lighting. A light-transmitting cover is mounted to the casing for covering the open chamber. A lens is formed on the cover for focusing the surrounding light onto the photo-sensitive resistor. An indicator capable of giving off light of two different colors is mounted to the circuit board whereby when the charger is charging a mobile phone, the indicator gives off the first light and when the charging is done, the indicator gives off the second light.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE INVENTION

Figure 1:
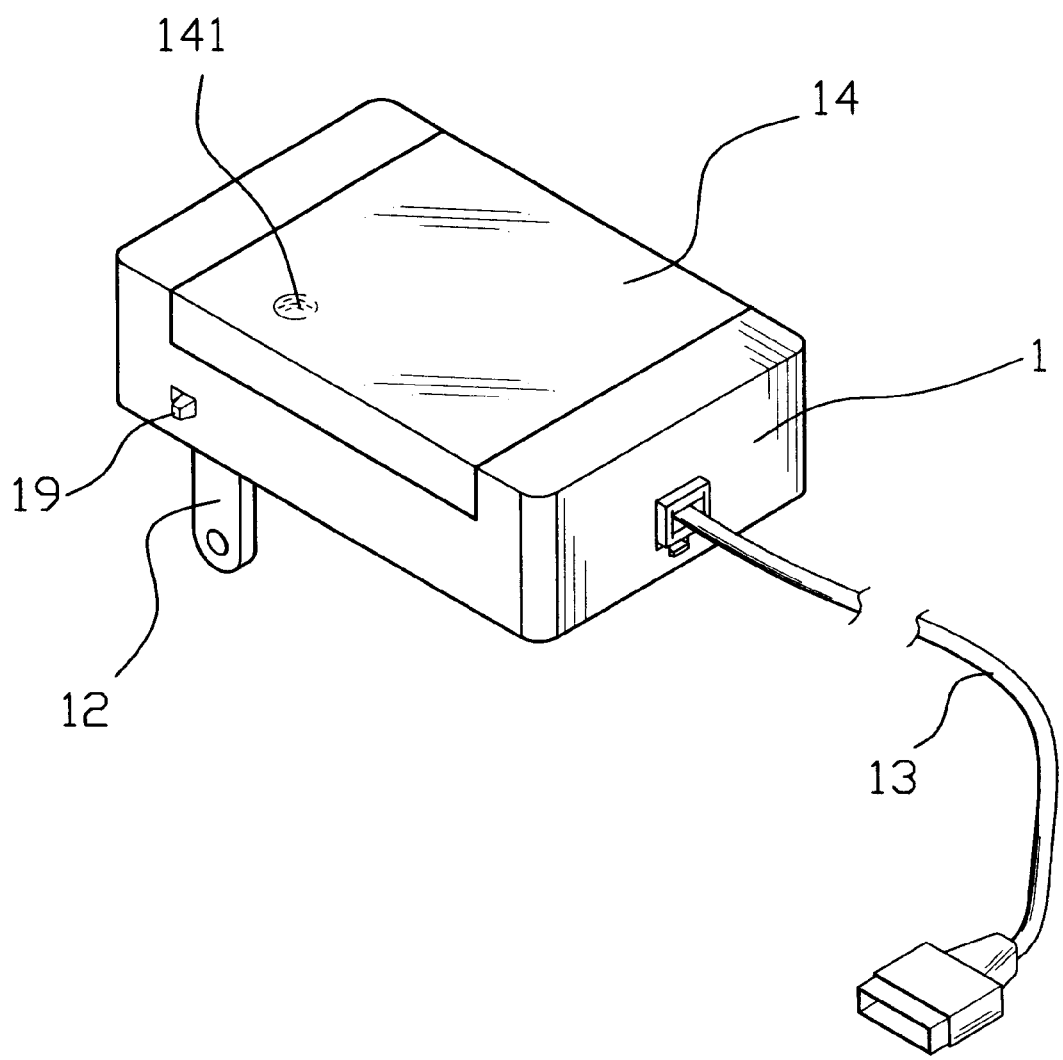
FIG. 1 is a perspective view of a mobile phone charger constructed in accordance with the present invention.

With reference to the drawings and in particular to FIG. 1, a mobile phone charger constructed in accordance with the present invention comprises a body comprising a casing 1 to which a plurality of conductive blades 12 (only one being visible in the drawings) are mounted for plugging in for example a wall outlet (not shown) and a cable 13 extending from the casing 1 and forming a connector 132 on a remote free end for releasable connection with a mobile phone (not shown) to power and charge the mobile phone.

Figure 2:
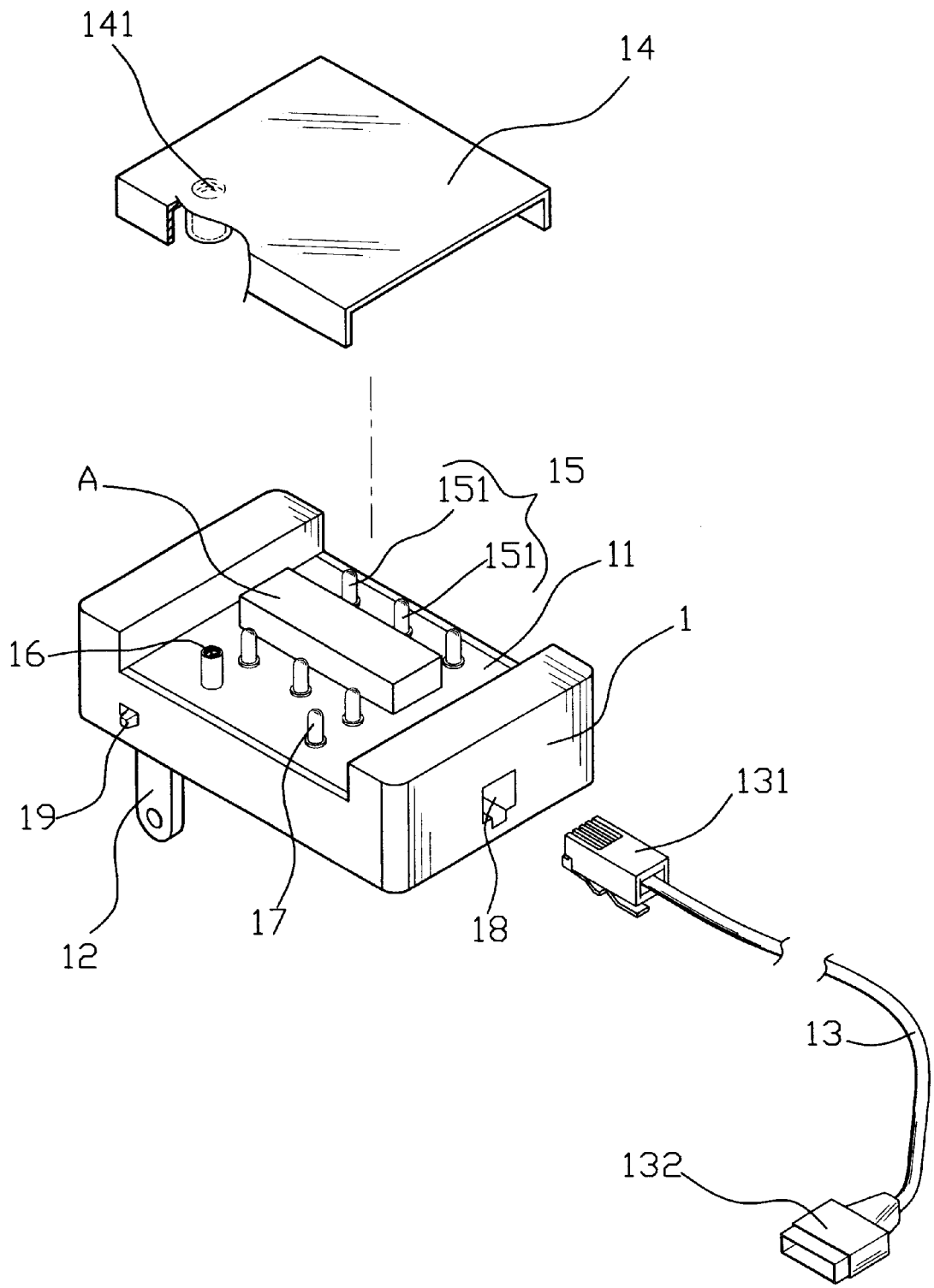
FIG. 2 is an exploded view of the mobile phone charger of the present invention.
Figure 3:
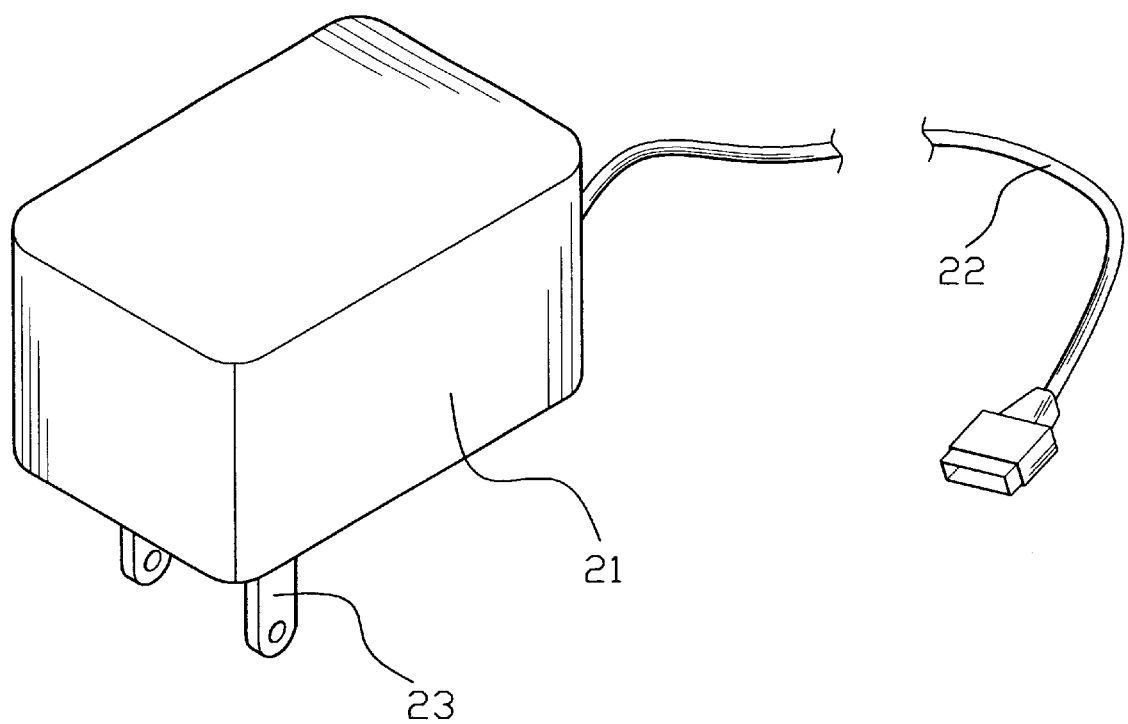
FIG. 3 is a perspective view of a conventional mobile phone charger.

Also referring to FIG. 2, the casing 1 defines an open chamber (not labeled) inside which a circuit board 11 is mounted for carrying a control circuit and electronic and electrical parts, generally illustrated with a parallelepiped body designated with reference character A. Since the circuit is known, there is no detail of the circuit and the electrical parts hereinafter and it is understood that the parallelepiped body A represents all necessary electrical parts. The circuit board 11 is in electrical connection with the blades 12 to receive electricity therefrom.

A light 15 comprised of a number of lighting elements 151, such as light emitting diodes, is mounted to the circuit board 11 to emit light when energized by the circuit board 11. A photo-sensitive resistor 16 is mounted on the circuit board 11 for detection of surrounding darkening. When the photo-sensitive resistor 16 detects the surroundings are darkening to a predetermined threshold, the circuit board 11 turns on the light emitting diodes 151 to give off lights. When the surroundings become bright, the circuit board 11 turns the light emitting diodes 151 off.

A cover 14 made of light-transmitting material is mounted to the casing 1 for covering the open chamber. The cover 14 can be treated to have a defrosted surface to make the light transmitted therethrough softer.

To ensure proper response to the change of environmental lighting, a lens 141 is formed on the cover 14, corresponding in position to the photo-sensitive resistor 16. The lens 141 is made clear and completely transmitting to light. If desired, the lens 141 is made convex for focusing light onto the photo-sensitive resistor 16.

A shield 161 made of non-light-transmitting material surrounds the photo-sensitive resistor 16 to block light from the light emitting diodes 151 onto the photo-sensitive resistor 16 so as to reduce the risk of malfunction. The cover 14 forms a cylinder 142 substantially concentric with the lens 141. The cylinder 142 is made of opaque materials whereby only light transmitting through the lens 141 can be received by the photo-sensitive resistor 16.

An indicator 17 is mounted to the circuit board 11. The indicator 17 comprises a lighting device capable of giving off lights of different colors. When the charger is charging a mobile phone, the indicator 17 gives off a first light, such as red light, and when the charging is done, the indicator 17 gives off a second light, such as a green light.

The casing 1 forms a socket 18 comprised of conductors in electrical connection with the circuit board 11. A plug 131 comprised of conductors in electrical connection with the cable 13 is formed on an inner end of the cable 13 for releasably mating the socket 18 to form an electrical connection between the cable 13 and the circuit board 11. The connector 132 formed on the remote end of the cable 13 electrically connects the mobile phone to the circuit board 11 for charging the mobile phone. The releasable connection between the cable 13 and the casing 1 allows a user to replace the cable 13 with another cable (not shown) having a remote end connector of different specification for connection with a different mobile phone.

In operation, a user may plug the blades 12 of the charger into a wall outlet and leaves the charger in connection with wall outlet. The photo-sensitive resistor 16 provides a detection of the surrounding lighting and the circuit board 11, in response thereto, controls the light emitting diodes 151 on and off. The cable 13 is selectively connected to the charger via the mating of the plug and socket pair (131, 18) for charging a mobile phone. The cable 13 can be removed as desired when not charging the mobile phone or simply left with the charger.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A mobile phone charger comprising:
   a body comprising a casing having an open chamber in which a circuit board is fixed, conductors in electrical connection with the circuit board and extending beyond the casing for connection with an external power source;
   a light mounted to the circuit for giving off light when energized by the circuit board;
   a device mounted to the circuit board for detecting surrounding light whereby when the surrounding light is changed, the circuit board energizes the light to give off light; and
   a cable having a remote end forming a connector for connection with a mobile phone and an inner end attached to the body and in electrical connection with the circuit board.

2. The mobile phone charger as claimed in claim 1, wherein the inner end of the cable is releasably attached to the casing.

3. The mobile phone charger as claimed in claim 2, wherein the inner end of the cable forms a plug and wherein the casing defines a socket releasably mating the plug.

4. The mobile phone charger as claimed in claim 1, further comprising an indicator mounted to the circuit board, the indicator giving off signals indicating charging operation of the mobile phone.

5. The mobile phone charger as claimed in claim 4, wherein the indicator gives off lights of two colors for indicating different conditions of charging.

6. The mobile phone charger as claimed in claim 1, wherein the light comprises a plurality of light emitting diodes mounted to the circuit board.

7. The mobile phone charger as claimed in claim 1, further comprising a light-transmitting cover attached to the casing for covering the open chamber.

8. The mobile phone charger as claimed in claim 7, wherein cover has a defrosted surface.

9. The mobile phone charger as claimed in claim 7, wherein the cover forms a lens for focusing the surrounding light onto the device for detecting the surrounding light.

10. The mobile phone charger as claimed in claim 1, wherein the device for detecting surrounding light comprises a photo-sensitive resistor.

11. The mobile phone charger as claimed in claim 10, further comprising a non-light-transmitting shield surrounding the photo-sensitive resistor whereby the photo-sensitive resistor only receives light transmitting through the cover.

\* \* \* \* \*